(12) United States Patent
Szentmihályi et al.

(10) Patent No.: US 9,939,029 B2
(45) Date of Patent: Apr. 10, 2018

(54) DRIVE ARRANGEMENT FOR A DRIVE TRAIN

(71) Applicants: Neumayer Tekfor Engineering GmbH, Hausach (DE); Bayerische Motoren Werke Aktiengesellschaft, München (DE)

(72) Inventors: Volker Szentmihályi, Gutach (DE); Alexander Ebert, Oberkirch (DE); Thomas Etzold, Offenburg (DE); Martin Lehmann, Hornberg (DE); Tobias Hertter, München (DE); Michael Hombauer, Parsdorf (DE)

(73) Assignees: Neumayer Tekfor Engineering GmbH, Hausach (DE); Bayerische Motoren Werke Aktiengesellschaft, Munich (DE)

( * ) Notice: Subject to any disclaimer, the term of this patent is extended or adjusted under 35 U.S.C. 154(b) by 227 days.

(21) Appl. No.: 14/709,397

(22) Filed: May 11, 2015

(65) Prior Publication Data

US 2015/0240885 A1 Aug. 27, 2015

Related U.S. Application Data

(63) Continuation of application No. PCT/EP2013/003385, filed on Nov. 11, 2013.

(30) Foreign Application Priority Data

Nov. 12, 2012 (DE) .................. 10 2012 022 011

(51) Int. Cl.
*F16D 23/14* (2006.01)
*B60K 17/22* (2006.01)
(Continued)

(52) U.S. Cl.
CPC .............. *F16D 23/14* (2013.01); *B60K 17/22* (2013.01); *F16D 3/10* (2013.01); *F16D 3/22* (2013.01);
(Continued)

(58) Field of Classification Search
CPC .......... F16D 11/10; F16D 11/14; F16D 23/14; F16D 3/10; F16D 3/22; F16D 3/223
See application file for complete search history.

(56) References Cited

U.S. PATENT DOCUMENTS 5,269,399 A * 12/1993 Ito .......................... B60K 17/24
180/248
6,881,107 B2 4/2005 Roycroft
(Continued)

FOREIGN PATENT DOCUMENTS

CN 1443122 A 9/2003
CN 1711178 A 12/2005
(Continued)

OTHER PUBLICATIONS

International Preliminary Report on Patentability dated May 21, 2015, received in corresponding International Patent Application No. PCT/EP2013/003385.
(Continued)

*Primary Examiner* — Huan Le
(74) *Attorney, Agent, or Firm* — Knobbe Martens Olson & Bear LLP

(57) ABSTRACT

A drive arrangement for a drive train of a vehicle is disclosed. In one aspect, the drive arrangement includes at least one transmission element configured to transmit a force and/or a torque and at least one joint. The transmission element and the joint are configured to be connected reversibly in a force transmitting manner and/or in a torque-transmitting manner.

6 Claims, 3 Drawing Sheets

(51) Int. Cl.
   *F16D 3/223* (2011.01)
   *F16D 11/10* (2006.01)
   *F16D 47/02* (2006.01)
   *F16D 3/10* (2006.01)
   *F16D 3/22* (2006.01)
   *F16D 11/14* (2006.01)
   *F16D 11/00* (2006.01)

(52) U.S. Cl.
   CPC .............. *F16D 3/223* (2013.01); *F16D 11/10* (2013.01); *F16D 11/14* (2013.01); *F16D 47/02* (2013.01); *F16D 2011/002* (2013.01)

(56) References Cited

U.S. PATENT DOCUMENTS

2002/0094230 A1    7/2002   Weckerling et al.
2003/0209939 A1   11/2003   Hahn
2009/0186706 A1*   7/2009   Arden .................... F16D 3/223
                                                                                              464/46

FOREIGN PATENT DOCUMENTS

| DE | 32 34 456 A1 | 3/1984 |
| DE | 10 2011 106355 A1 | 1/2012 |
| EP | 0 879 728 A2 | 11/1998 |
| GB | 2200968 A | 8/1988 |
| GB | 2 255 380 A | 11/1992 |
| GB | 2394698 A | 5/2004 |
| WO | WO 02/14092 A1 | 2/2002 |
| WO | WO 2010/069578 A1 | 6/2010 |

OTHER PUBLICATIONS

International Search Report dated Feb. 11, 2014, received in International Application No. PCT/EP2013/003385.
Examination Report issued in corresponding application CN 201380057219.9 dated Nov. 28, 2016.

* cited by examiner

DRIVE ARRANGEMENT FOR A DRIVE TRAIN

CROSS-REFERENCE TO RELATED APPLICATIONS

This application is a continuation application, and claims the benefit under 35 U.S.C. §§ 120 and 365 of PCT Application No. PCT/EP2013/003385, filed on Nov. 11, 2013, which is hereby incorporated by reference. PCT/EP2013/003385 also claimed priority from German Patent Application No. 10 2012 022 011.1 filed on Nov. 12, 2012, which is hereby incorporated by reference.

BACKGROUND

Field

The described technology generally relates to a drive arrangement for a drive train of a vehicle.

Description of the Related Technology

The drive train of a vehicle generally serves to transmit the power and the torque of at least one motor to the wheels of the vehicle. There are vehicles in which both transverse axles are driven, so-called four-wheel vehicles. For most vehicles, however, only one axle is driven. However, there are vehicles for which the four-wheel function is not permanently given, but can be switched on and off.

A mechanical separation in the drive train generally can increases the efficiency of the vehicle and also allows for an easier use of different drive systems for hybrid drives.

For switching between the driving of only one axle and the four-wheel driving, in the state of the art already several implementations are known.

The document WO 2010/069578 A1 discloses a clutch assembly with a differential by which the drive shaft of a vehicle driven by several axles can be switched on.

The published patent application US 2003/0209939 A1 describes an arrangement by which the force transmission and the torque transmission to a wheel of a motor vehicle can be canceled via a gear coupling.

The distribution of a torque to both axles of a motor vehicle is realized according to the published patent application EP 0 879 728 A2 via a planetary gear and a double separation mechanism.

The couplings partially used in the prior art are usually associated with an increased space requirements and an increased weight.

SUMMARY OF CERTAIN INVENTIVE ASPECTS

One inventive aspect relates to a drive arrangement as a part of a drive train, which allows a connection and disconnection of the force transmission and/or the torque transmission, for example, to an axle.

The drive arrangement can include at least one transmission element provided for transmitting the force and/or the torque and at least one joint, wherein the transmission element and the joint can be reversibly connected to each other in a force transmitting manner and/or in a torque transmitting manner.

Such a joint can be found, for example in the published patent application DE 10 2011 106 355 A1.

An advantage of the drive arrangement is, for example, that it is based on an arrangement which has been already used for many conventional vehicles. In this case, the joints in the drive trains of the prior art serve mainly to compensate for mutually offset sections or components of the drive train and in addition, especially in the form of plunging joints also to permit axial relative movements between the portions of the drive train. In some embodiments, no fundamentally new elements have to be inserted into the drive train. Since only an already existing drive arrangement is extended in respect to the reversibility, also the space requirement will be correspondingly lower and less additional weight will be caused.

In some embodiments, the arrangement between the joint and a transmitting element, which is designed, for example, as a shaft, is modified such that the transmission element and the joint in relation to the transmission of the forces and/or the torques can be reversibly connected to one another. The transmission can be generated and dissolved again so. This in turn makes it possible, for example, to switch on or switch off one axle. In some embodiments, the transmission element and the joint are not fixed to each other with respect to the transmission of forces and torques, but the connection or the transmission is temporarily created or canceled, for example, for an embodiment for a form-fitting connection or transmission.

In some embodiments, at least one actuating device is provided, which generates a force transmitting connection and/or a torque transmitting connection between the transmission element and the joint and/or which cancels that connection. The reversible connection, which can be switched on and which can be switched off again, between the transmission element and the joint can include an actuating device. The actuating device can be configured as a switch that can turn on or off the transmission of a force or a torque.

One embodiment includes the joint in use, for example, a so-called sliding joint. The joint can include at least one outer part with ball tracks, an inner part with ball tracks, whereas the inner part is at least partially placed within the outer part, a windows containing cage being arranged between the outer part and the inner part, and cage balls being arranged in the windows of the cage. Here, for one configuration of the joint, the joint is designed as a sliding joint, so that the outer part and the inner part can be moved in regard to each other mainly axially along a longitudinal axis of the joint (or specifically: can be slidden). The numbers of the ball tracks of the outer part and of the inner part can be the same, wherein the ball tracks are each associated in pairs. In one embodiment, for each pair of ball tracks, a ball is arranged in the window of the (spherical) cage. Such joints are already well known in the art.

In some embodiments, the actuating device cancels the force transmitting connection and/or the torque transmitting connection between the transmission element and the joint by the actuating device moving the outer part and the inner part in such a way relative to each other that the balls are arranged outside of the ball tracks of the outer part and/or outside of the ball tracks of the inner part. Thus, the actuating device moves the outer part and the inner part—by moving either the outer part or the inner part—in such a way relative to each other, that the balls are not arranged in the ball tracks of the outer part and the inner part. However, if the balls are no longer placed in the ball tracks of the outer part and/or of the inner part, no force transmission and no torque transmission between the outer part and the inner part can be made any longer via the balls.

Conversely, for a further additional or an alternative embodiment, the actuating device generates the force transmitting connection and/or the torque transmitting connection by moving the outer part and the inner part in such a way relative to one another, that the balls are placed within the ball tracks of the outer part and within the ball tracks of the inner part. In this case, this connection can be reversible; meaning that it can be canceled again by generating a reverse separating relative movement, for example, in the manner of the previously described embodiment. Thus, a four-wheel drive can be switched on and is not always given.

The actuating device can include at least one sliding sleeve. By this sliding sleeve, the actuating device can move the outer part relative to the inner part.

In some embodiments, the transmission member is constructed and arranged that it can be rotated along a rotational axis and the joint is constructed and arranged that it can be rotated along a longitudinal axis. Therefore, in the connected or coupled state, a force and a torque can be transmitted via the joint. For switching on and off of the connections and thus for its reversibility, the outer part and the inner part can be moved relative to each other along the longitudinal axis.

In some embodiments, a loose ring is provided adjacent to the ball tracks of the outer part. For one alternative, the loose ring can be provided with, for example, the contour which the outer part also shows on its inner side. Furthermore, the actuating device can shift for canceling the force transmitting and/or the torque transmitting connection the outer part relative to the inner part such that the balls are arranged inside the loose ring. The inner part can move not axially, but remain in its position. Due to the relative movement between the outer part and inner part, thus the balls can move from the ball tracks of the outer part to the structure of the loose ring, for example, having the ball tracks.

A suitable structure of another structure carrying part can extend to the ball tracks of the inner part, which for the non-connected state of the outer part and the inner part guides or holds the balls for this alternative embodiment.

The structure or the contours of the outer part and of the loose ring can be designed such that they allow a displacement of the balls for generating or for canceling the connection between the transmission element and the joint, whereby the connection is reversible.

In some embodiments, if the loose ring includes ball tracks for the balls, for the generating of the connection, the outer part and the loose ring have no or only a slight revolution speed difference to ensure that the balls can move back from the loose ring into the ball tracks of the outer part.

In some embodiments, the loose ring is pivoted in at least one bearing element. The loose ring can serve to hold the balls in a non-connected state from the transmitting element and the joint, and a force connection and a torque connection between the loose ring and the outer part or the transmission element may also need to be prevented or at least to be minimized. The loose ring can be pivoted in at least one bearing element, such as a roller bearing. For a compact and stable structure, the loose ring is, for example, arranged by the at least one bearing element in a recess of the outer part.

In some embodiments, the transmission element is at least partly constructed in a sleeve-like manner, for example, at the section facing the joint.

DETAILED DESCRIPTION OF CERTAIN INVENTIVE EMBODIMENTS

Figure 1:
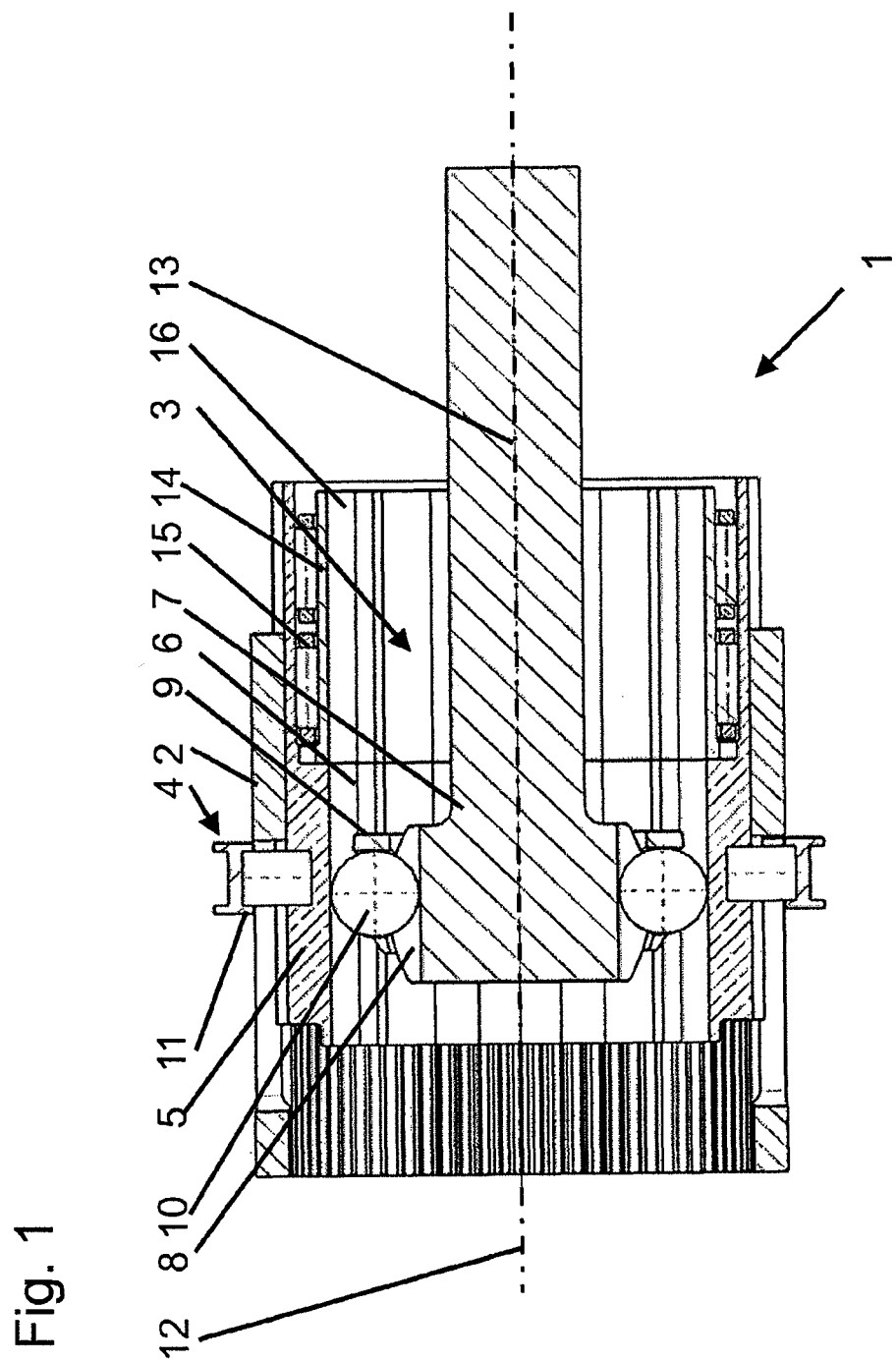
FIG. 1 a schematic view of a drive train which shows the functional interactions in a section in a first state according to one embodiment.
Figure 2:
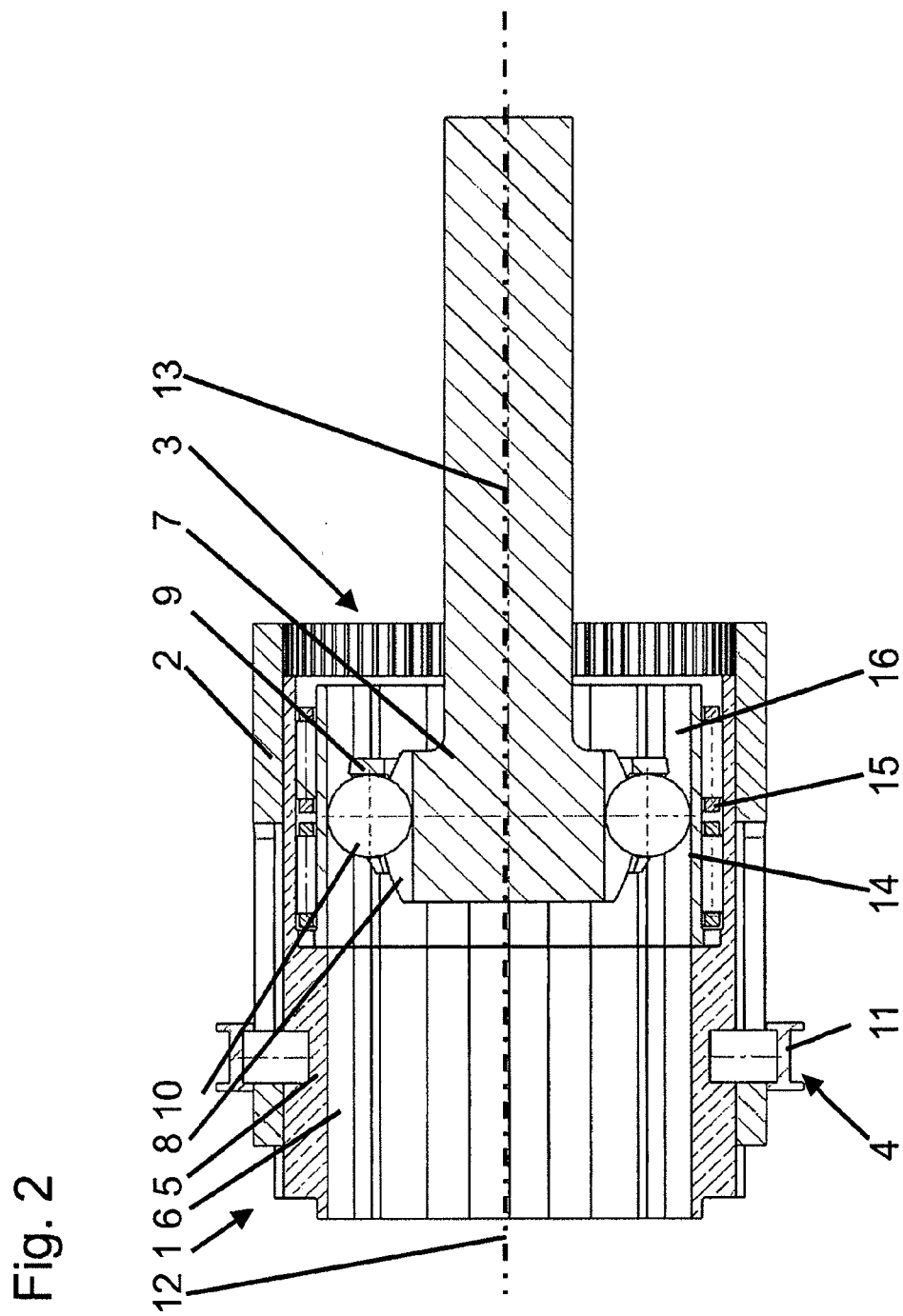
FIG. 2 shows an arrangement of the drive train shown in FIG. 1 in a second state according to one embodiment.
Figure 3:
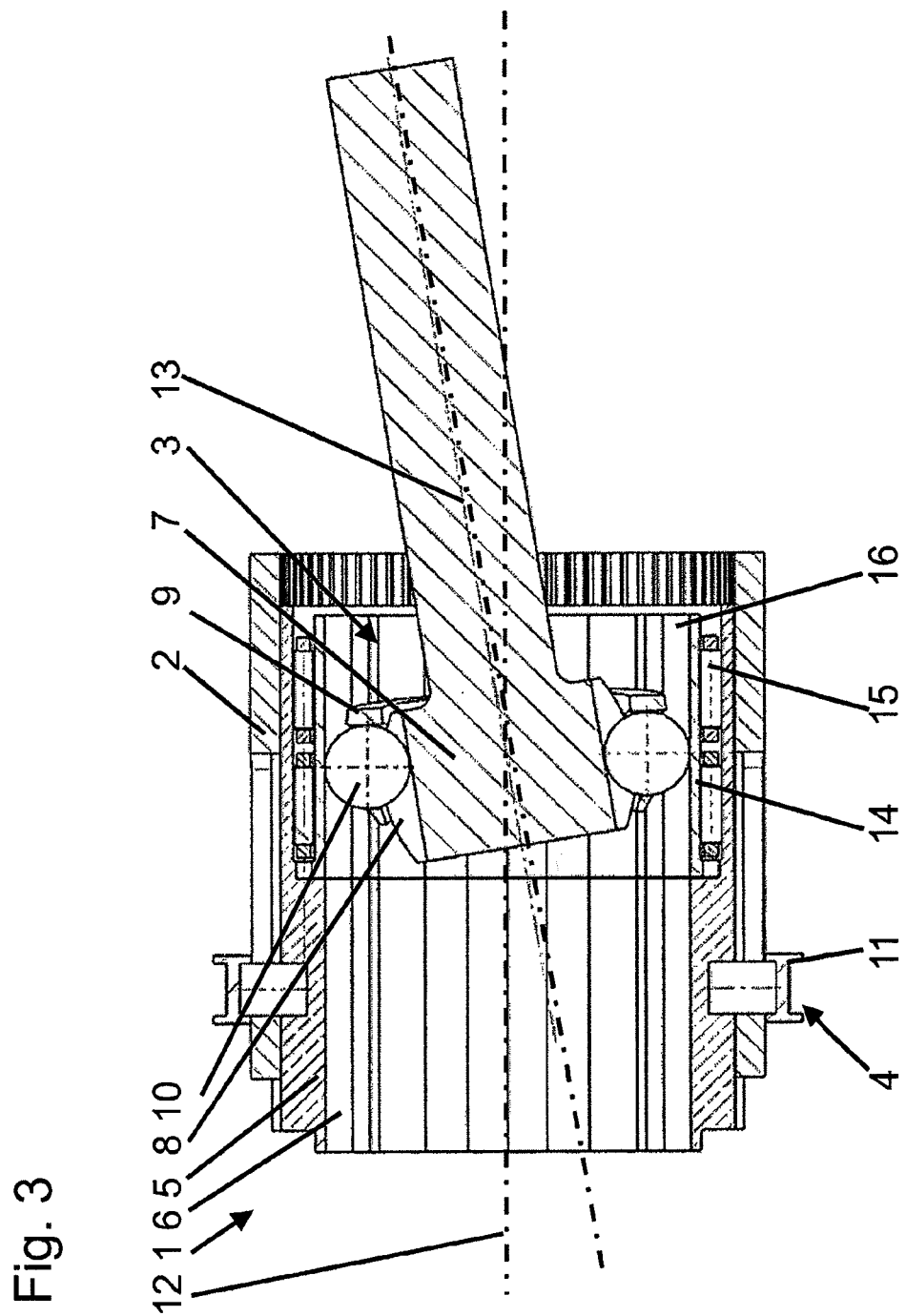
FIG. 3 shows an arrangement of the drive train shown in FIGS. 1 and 2 in the second state with an angled joint.

In FIGS. 1-3 show an embodiment of a drive arrangement 1 of a drive train of a vehicle. The drive train can be in the form of a longitudinal drive shaft or a lateral drive shaft. The drive train 1 can be connected to additional components such as transmission output shafts, differential output shafts or differential input shafts, wheel hubs and the like, which are not shown here. For example, length compensation elements can be provided, which are also not shown here.

The drive arrangement 1 includes a transmission element 2 and a joint 3. The transmission element 2 can be designed in part like a sleeve and can be, for example, a part of a shaft which is subjected to a torque of an engine. The force or the torque can be guided by the transmitting element 2. In order to control the force connection and/or the torque connection between the transmission element 2 and the joint 3, an actuating device 4 is provided, i.e., for generating or cancelling the force connection and/or the torque connection.

The joint 3 can be a so-called sliding joint which allows an axial displacement in addition to the transmission of the torque. The joint 3 can include an outer part 5, which is provided with ball tracks 6, and an inner part 7, which is also provided with ball tracks 8. The ball tracks 6 and 8 of the outer part 5 and of the inner part 7, respectively, can be assigned in pairs. Between the outer part 5 and the inner part 7, there is arranged a cage 9 with windows in which the balls 10 are guided. The balls 10 serve for the actual force transmission and the actual torque transmission between the outer part 5 and the inner part 7, and these balls are held by the cage 9 respectively in a plane, in order to prevent a jamming of the joint 3. In the state which is shown in FIG. 1, there are the balls 10 in the ball tracks 6 of the outer part 5 and in the ball tracks 8 of the inner part 6, so that the force transmission and the torque transmission takes place via the balls 10 between the outer part 5 and the inner part 7 of the joint 3.

The outer part (or outer hub) 5 can be on a sliding sleeve 11 (or in general a shifting collar) as a part of the actuating device 4 connected to the transmission element 2, so that there can be a force transmission and a torque transmission between the two components. The sliding sleeve 11 can be configured to move the outer part 5 relative to the inner part 7.

The transmission element 2 can be rotated along a rotation axis 12 and the joint 3 can be rotated along the longitudinal axis 13. In this state of the force transmission and/or of the torque transmission between the transmission element 2 and the joint 3, both axes 12 and 13 overlap. Along the longitudinal axis 13 of the joint 3, the outer part 5 and the inner part 7 can be displaceable relative to one another.

By the sliding sleeve 11, the outer part 5 is displaced along the longitudinal axis 12 relative to the inner part 7, to control (e.g., to interrupt or to generate) the force transmission and the torque transmission between the transmitting element 2 (and hence also between the components of the drive train which are associated or subordinated to the transmitting member 2 and which are not shown here) and the joint 3 and the components which are connected to joint and which are not shown here.

In the state shown, the outer part 5 and the inner part 7 of the joint 3 are positioned relative to each other so that the balls 10 engage both in the ball tracks 6 of the outer part 5 and in the ball tracks 8 of the inner part 7, whereby the force transmission and/or the torque transmission takes place.

Adjacent to the ball tracks 6 of the outer part 5, a loose ring 14 is provided, which is rotatably supported via bearing elements 15 in the outer ring 5 (here, as an example, the bearing elements are roller bearings). The loose ring 14 can rotate freely about the longitudinal axis 13 of the joint 3 without a force connection or a torque connection with the outer part 5. In the loose ring 14, there are provided structures 16 that correspond to the ball tracks 6 of the outer part 5.

FIG. 2 shows the drive arrangement 1 of FIG. 1 after the outer part 5 has been moved by the actuating device 4 in such a way that the balls 10 are outside of the ball tracks 6 of the outer part 5 and inside of the ball tracks 16 of the loose ring 14, while the inner part 7 stands still. Thereby, the balls 10 do not transmit any force or any torque between the outer part 5 and the inner part 7.

For the illustrated exemplary embodiment of the drive arrangement 1, the loose ring 14 is entrained thereby during a movement of the outer part 5, whereby for decoupling movement of the shift sleeve 11, the balls 10 come from the ball tracks 6 of the outer part 6 into the ball tracks 16 of the loose ring 14. However, since the loose ring 14 is freely rotatably pivoted in the bearing element 15, there is no force or no torque transmission via the balls 10 between the outer part 5 and the inner part 7 so that the both sides of the drive train, between which the joint 3 is arranged, are decoupled from each other.

For an alternative embodiment, which is not shown here, the inner part 7 is moved relative to the outer part 5, so that the balls 10 leave the ball tracks 8 of the inner part 7 and are in a structure of a suitable carrier element or of an auxiliary element.

FIG. 3 shows the "decoupled" state of the drive arrangement 1 of FIG. 2 with a bent joint 3 relative to the straight joint 3 of FIGS. 1 and 2. The inner part 7 is angled with respect to the outer part 5 so that also the longitudinal axis 13 of the joint 3 is no longer coincident with the axis of rotation 12 of the transmission element 2.

While the inventive technology has been described with reference to the figures, it will be understood by those of ordinary skill in the art that various changes in form and details may be made therein without departing from the spirit and scope as defined by the following claims.

What is claimed is:

1. A drive arrangement for a drive train of a vehicle, the drive arrangement comprising:
    at least one transmission element configured to transmit a force and/or a torque;
    at least one joint; and
    at least one actuating device configured to perform and/or cancel a force transmitting connection and/or a torque transmitting connection between the transmission element and the joint,
    wherein the transmission element and the joint are configured to be connected reversibly in a force transmitting manner and/or in a torque-transmitting manner,
    wherein the joint comprises at least one outer part with ball tracks, an inner part with ball tracks arranged at least partially in the outer part, a window containing cage being placed between the outer part and the inner part, and balls being arranged in the windows of the cage,
    wherein the transmission element is rotatable along a rotational axis, wherein the joint is rotatable along a longitudinal axis, and wherein the outer part and the inner part are movable along the longitudinal axis relative to each other.

2. The drive arrangement according to claim 1, wherein the actuating device is configured to move the outer part and the inner part in such a way relative to one another that the balls are arranged outside of the ball tracks of the outer part.

3. The drive arrangement according to claim 2, wherein the actuating device has at least one sliding sleeve, over which the actuating device moves the outer part relative to the inner part.

4. The drive arrangement according to claim 2, further comprising a loose ring arranged adjacent to the ball tracks of the outer part, wherein the actuating device is configured to move the outer part in such a way relative to the inner part, and wherein the balls are arranged inside the loose ring.

5. The drive arrangement according to claim 4, wherein the loose ring is pivoted in at least one bearing element.

6. The drive arrangement according to claim 1, wherein the actuating device is configured to move the outer part relative to the inner part, and wherein the balls are arranged within the ball tracks of the outer part and within the ball tracks of the inner part.

* * * * *